Oct. 13, 1953  F. J. GEBAUER  2,655,277
RAKE ATTACHMENT FOR TRACTORS
Filed Jan. 15, 1951  3 Sheets-Sheet 1

Florian J. Gebauer
INVENTOR

BY C.A. Snowles.
ATTORNEYS.

Oct. 13, 1953  F. J. GEBAUER  2,655,277
RAKE ATTACHMENT FOR TRACTORS
Filed Jan. 15, 1951  3 Sheets-Sheet 2
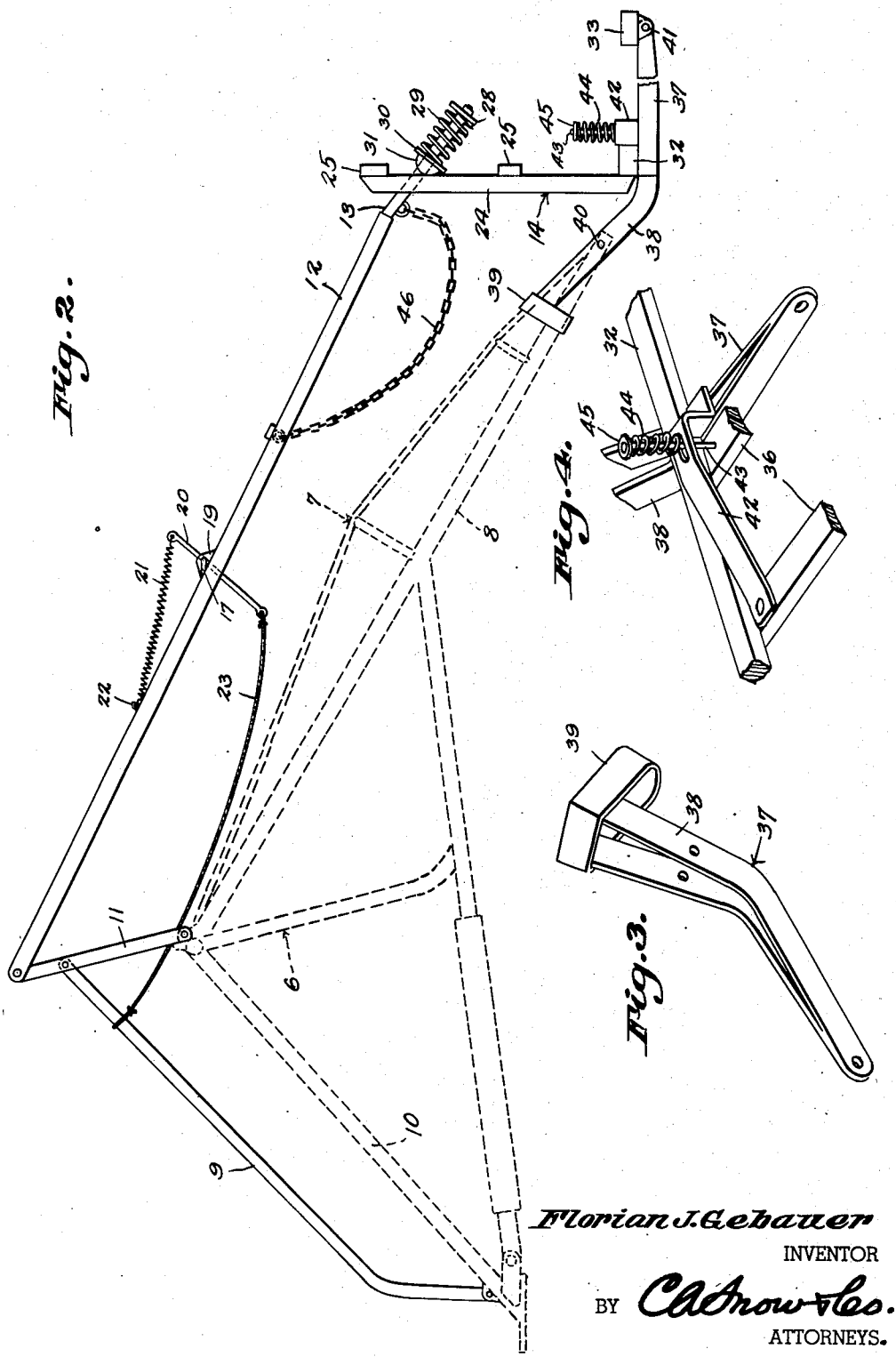
Florian J. Gebauer
INVENTOR
BY C.A. Snow & Co.
ATTORNEYS.

Oct. 13, 1953  F. J. GEBAUER  2,655,277
RAKE ATTACHMENT FOR TRACTORS
Filed Jan. 15, 1951  3 Sheets-Sheet 3
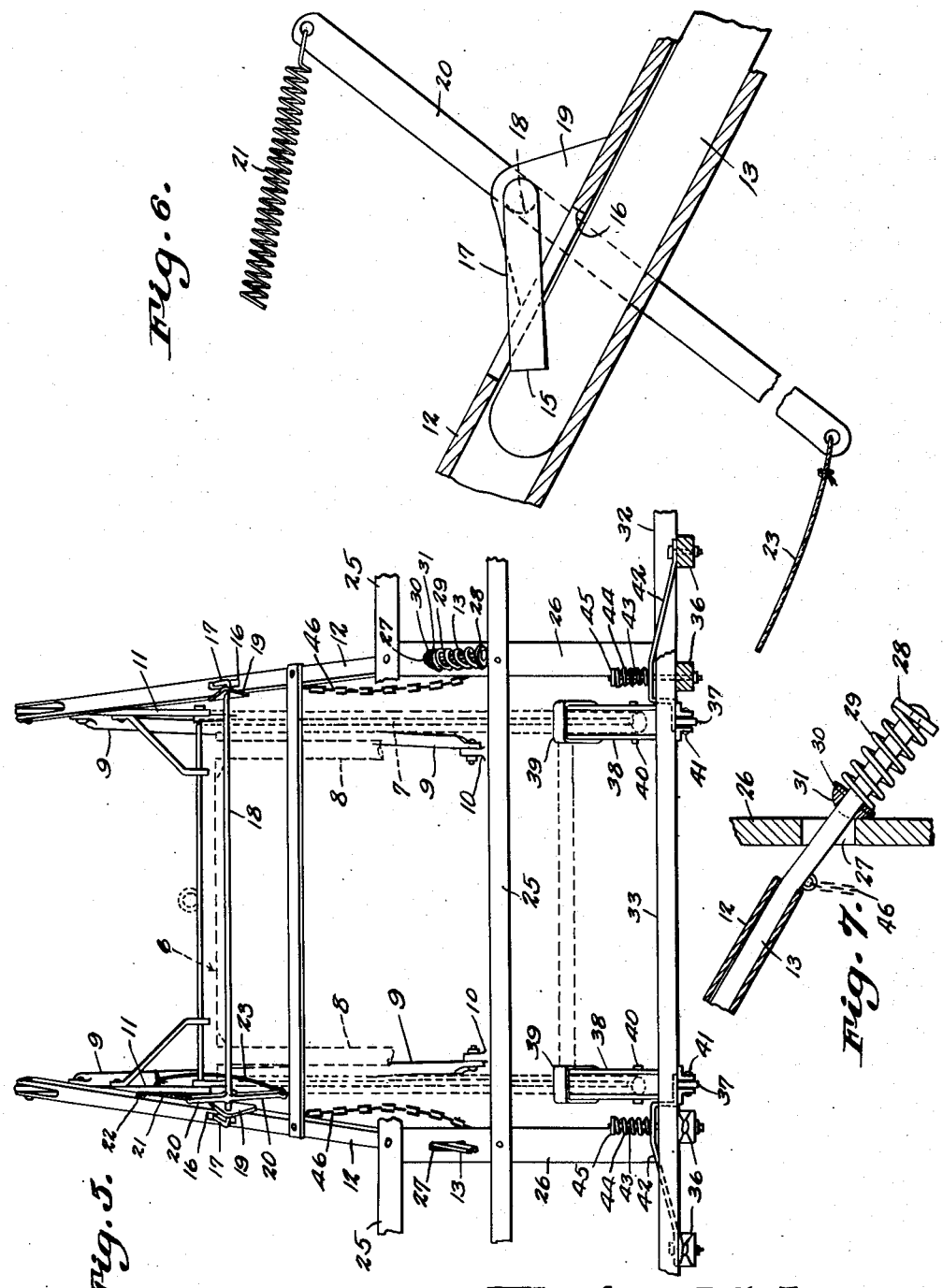
Florian J. Gebauer
INVENTOR
BY Catnow&Co.
ATTORNEYS.

Patented Oct. 13, 1953

2,655,277

UNITED STATES PATENT OFFICE 2,655,277

RAKE ATTACHMENT FOR TRACTORS

Florian J. Gebauer, Akron, Ohio

Application January 15, 1951, Serial No. 206,098

1 Claim. (Cl. 214—140)

This invention relates to an attachment designed for use in connection with loader attachment embodying swinging frames used on tractors for elevating materials by the operation of a scoop.

An important object of the invention is to provide a rake attachment which may be readily and easily secured to the free ends of the swinging supporting arms of loaders, in lieu of the usual scoop, the operation of the rake permitting use of the usual loader attachments for loading or handling hay, straw, or like material.

Another important object of the invention is to provide an attachment of this character which may be readily and easily mounted upon removal of the scoop of the usual loading device and one wherein the movements of the rake will be cushioned to relieve the swinging arms of the loading mechanism of undue strain.

A further object of the invention is to provide means for tilting the rake proper to prevent the load lifted by the rake from sliding therefrom.

Still another object of the invention is to provide means for releasing the rake for forward pivotal movement so that the rake may assume a position for moving under its load.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Fig. 2 is a side elevational view of the attachment, the boom to which the attachment is secured, being indicated in dotted lines.

Fig. 3 is a perspective view of one of the attaching arms for attaching the rake.

Fig. 4 is a fragmental perspective view illustrating the means for restricting movement of the rake frame with respect to the boom arms.

Fig. 5 is a front elevational view of the attachment.

Fig. 6 is an enlarged view partly in section illustrating the latch control means controlling the telescoping of the side bars of the attachment.

Fig. 7 is a sectional view illustrating the yieldable means employed in connecting the control rods of the attachment, to the rake frame.

Figure 1:
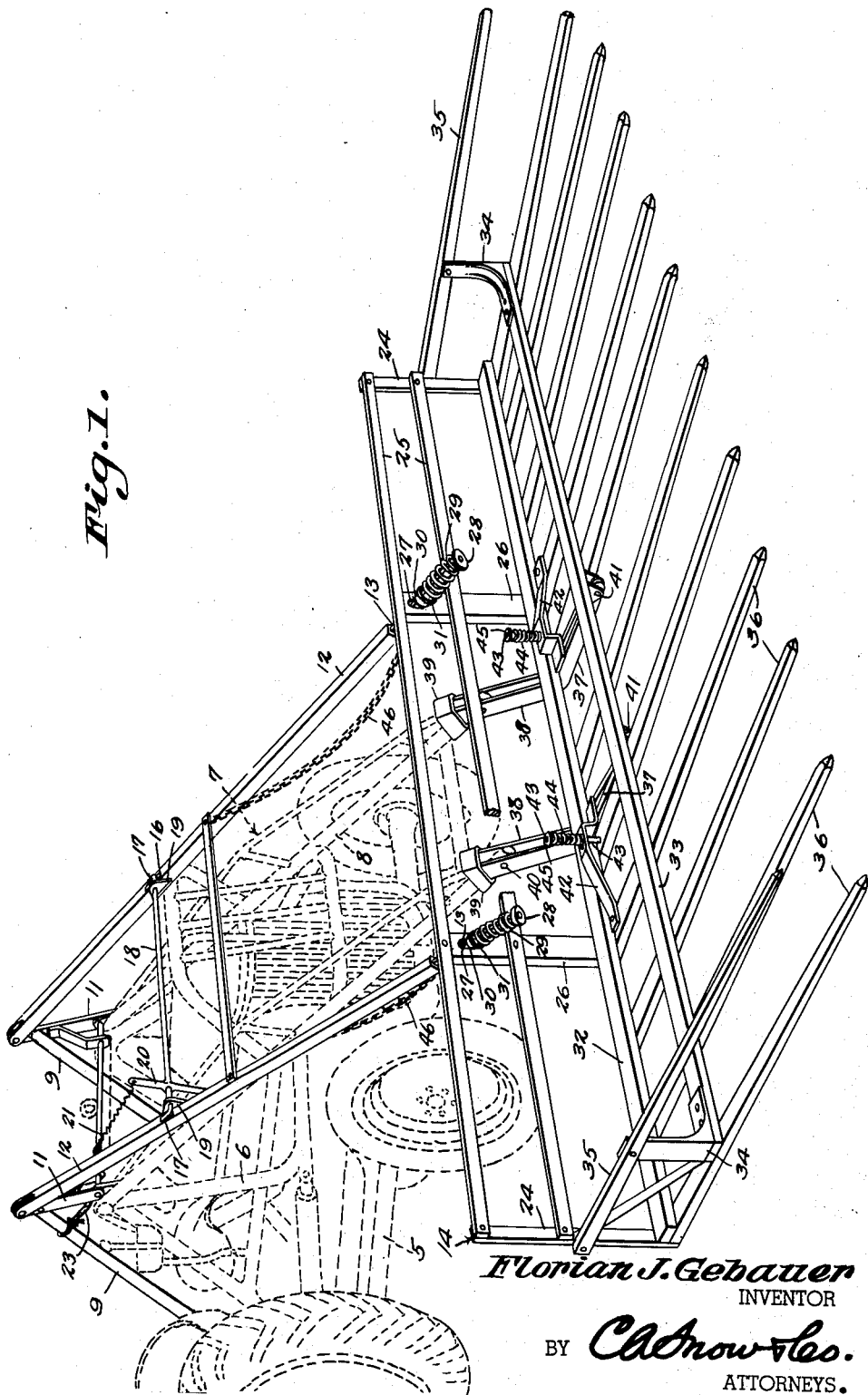
Figure 1 is a perspective view illustrating a tractor equipped with a conventional loading attachment, the rake forming the subject matter of the present invention being supported on the swinging arms of the loader.

Referring to the drawings in detail, the reference character 5 indicates the conventional tractor to which the loader frame 6 is pivotally connected, the loader frame embodying the usual boom 7 which includes pivoted arms 8 that extend forwardly beyond the front end of the tractor, as clearly shown by Fig. 1 of the drawings.

The rake attachment, forming the subject matter of the present invention, includes rear spaced bars 9 that have pivotal connection with the tractor, through the bars 10, forming a part of the loader attachment to which the rake attachment is connected.

Pivotally connected with the loader attachment, are upstanding bars 11 to which the forward ends of the bars 9 are pivotally connected, the connection between the bars 9 and 11 being spaced from the upper or free ends of the bars 11.

The side bars of the rake attachment embody telescoping sections 12 and 13, the sections 13 moving into the hollow sections 12 which are pivotally connected with the upstanding bars 11, at the upper ends of the bars 11, the forward ends of the sections 12 extending to points adjacent to the rake frame 14. The sections 13 which extend into the hollow sections 12, are formed with notches 15 adjacent to their inner ends, the notches being so arranged in the sections 13 that they will fall opposite to the slots 16 formed in the sections 12 where the notches are engaged by the right angled ends 17 of the rod 18 that is pivotally mounted in bearings 19 supported on the sections 12. A cross arm indicated at 20 is secured to the rod 18, to the upper end of which is connected the spring 21, the opposite end of the spring 21 being secured to the section 12 at 22, with the result that normally the cross arm 21 is urged towards the pivoted end of the section 12 which causes the ends 17, which provide latches, to move into contact with the section 13, as it moves through the section 12. It is obvious that when the section 13 moves to the position as shown by Fig. 6, the latches or right-angled ends 17, will move into the notches 15 holding the sections 12 and 13 together.

As clearly shown by the drawings, the cross arm 20 extends a distance below the rod 18 and is provided with an eye through which one end of the operating cable 23 extends, the opposite end of the cable 23 being disposed in proximity to the operator's seat, so that the cable may be pulled to move the latch 17 to disengage the section 13, allowing the section 13 to slide within the section 12.

The rake head or tine includes a rake frame comprising upstanding bars 24 secured in spaced relation with respect to each other by the horizontal bars 25. Adjacent to the center of the rake head or tine frame, are upstanding bars 26 that are also connected with the bars 25. These bars 26 are formed with vertically elongated openings 27 through which the forward ends of the sections 13 extend, the sections 13 having discs 28 secured at their forward ends against which the springs 29 rest, the opposite ends of the springs 29 engaging the discs 30 on which the rubber cushioning blocks 31 rest, the cushioning blocks 31 engaging the bars 26 adjacent to the openings 27, cushioning movements of the lift bars of the rake attachment, which include sections 12 and 14.

The rake head or tine frame also embodies longitudinally spaced horizontal bars 32 and 33, there being provided brackets 34 rising from the ends of the bar 33, to which the upper tines 35 of the rake are secured, the tines 36 which also form a part of the rake, being horizontally disposed and are secured to the horizontal bars 32 and 33 from which they extend forwardly, as clearly shown by Fig. 1 of the drawings.

The rake head or tine frame is provided with ready attaching slip on brackets 37, each of which embodies arms 38 secured together at their forward ends, while the rear ends thereof are spaced apart and connected with the yoke 39, the yoke of the brackets 37 being elongated to be fitted over the forward ends of the pivoted arms 8 of the boom of the loader to which the device is attached, the yokes having pivotal connection with the arms 8 at 40. The arms 38 have their forward ends disposed at acute angles with respect to the yokes 39 so that they fit under the bars 32 and 33 where they are pivotally connected with the bar 33 at 41. Secured to intermediate tines of the rake, are arms 42, which arms extend upwardly from the tines, and then downwardly to engage the brackets 37. Rods 43 are secured to tines adjacent to the tines on which the arms 42 are secured, and extend upwardly through elongated openings in the arms 42, there being provided coiled springs 44 resting on the arms 42 with their upper ends engaging the discs 45 secured on the upper ends of the rods 43. Thus it will be seen that due to this construction, upward tilting movement of the tines of the rake will be restricted, and the tines will be held in contact with the ground.

From the foregoing it will be seen that due to the construction shown and described, I have provided a rake attachment which may be readily and easily attached to the boom of the usual loader attachment for tractors, in lieu of the usual scoop of the loader, converting the attachment into a means for loading hay, straw or the like, material.

It will also be seen that due to the construction the operator of the tractor will have control of the rake at all times, to cause the rake to pick up hay or straw, and dump the load at the desired location.

Having thus described the invention, what is claimed is:

A combined rake and loader adapted to be attached to a tractor frame and boom thereof, comprising a rake frame including spaced parallel forwardly extended side bars, a tine frame forming a part of the device, to which said side bars are slidably connected adjacent to the upper edge of the tine frame, tines extending forwardly from the tine frame, brackets pivotally connected to the boom of the tractor and tine frame adjacent to the lower edge thereof, a yoke forming a part of each bracket, said yokes straddling said booms beyond the pivot points between the brackets and boom, providing stops restricting tilting movement of the tine frame with respect to the boom, and yieldable means embodying spring arms connected to certain of the tines, bearing against the brackets tilting said tine frame and tines towards the ground.

FLORIAN J. GEBAUER.

References Cited in the file of this patent

UNITED STATES PATENTS

| Number | Name | Date |
|---|---|---|
| 1,725,201 | Lessmann | Aug. 20, 1929 |
| 1,856,629 | Geister | May 3, 1932 |
| 2,305,119 | Walker | Dec. 15, 1942 |
| 2,311,671 | Larsen | Feb. 23, 1943 |
| 2,372,908 | Messing | Apr. 3, 1945 |
| 2,398,585 | Hayward | Apr. 16, 1946 |
| 2,471,192 | Boulton | May 24, 1949 |
| 2,518,105 | Werth | Aug. 8, 1950 |